UNITED STATES PATENT OFFICE 2,285,418

CONDENSATION PRODUCTS OF A UREA, AN ALIPHATIC ALDEHYDE AND A CHLORINATED ACETAMIDE

Gaetano F. D'Alelio, Pittsfield, Mass., assignor to General Electric Company, a corporation of New York No Drawing. Application August 9, 1939, Serial No. 289,277

13 Claims. (Cl. 260—70)

This invention relates to new condensation products and to methods of making the same. The invention is concerned more particularly with self-curing aminoplasts, by which is meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing ingredients comprising a urea, an aliphatic aldehyde, for example formaldehyde, and a halogenated amide, more particularly a chlorinated acetamide, e. g., chloroacetamide (monochloroacetamide). The initial condensation may be carried out at normal or at elevated temperatures, in the presence or absence of a condensation catalyst and under alkaline, neutral or acid conditions.

The halogenated amides used in practicing this invention are neutral, stable bodies. For example, mono-, di- and tri-chloroacetamide, which are solids at normal temperatures, melt and distill without decomposition. In all cases, the amide grouping is capable of reaction with aliphatic aldehyde since it possesses a nitrogen atom to which is attached at least one hydrogen atom.

The urea component may be, for instance, urea ($NH_2CONH_2$) itself; thiourea; iminourea (guanidine); aldehyde-reactable substituted ureas, thioureas and iminoureas such as methyl urea, acetyl urea, benzoyl urea, phenyl thiourea, asymmetrical diethyl urea, allyl urea, 2-chloroallyl urea, ethylidene urea, methylol urea, methylene urea, dicyandiamide (cyano-imino urea), guanylurea, guanylthiourea, biguanidine, aminoguanidine, creatine (guanidine methyl glycine) and guanoline (guanido carbonic ethyl ester). Terms such as "a urea," "urea component" and "urea substance," as used generally herein and in the appended claims, are intended to include within their meaning substances of the kind above mentioned.

In producing the new condensation products, which may be described more specifically as co-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from the imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The curved products have good light stability, excellent water resistance and surface finish and, in general, meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated amide to a partial condensation product of a urea and an aliphatic aldehyde and effect further condensation between the components. Or, I may first condense the halogenated amide with aliphatic aldehyde, add the resulting product to a urea-aliphatic aldehyde partial condensation product and then cause the reaction to proceed further. Or, I may condense or partially condense a halogenated amide with a mol excess of an aliphatic aldehyde, add a urea to this condensation product and effect further reaction between the components. Still other ways may be employed in combining the components and in producing the unmodified or modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble, infusible state.

Depending upon the particular reactants employed and the particular conditions of reaction, the intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration:

*Example 1*

| | Parts by weight |
|---|---|
| Urea | 60.0 |
| Aqueous ammonia (28% NH₃) | 7.6 |
| Aqueous formaldehyde (approximately 37.1% HCHO) | 161.0 |
| Sodium hydroxide (in 1 part water) | 0.04 |
| Monochloroacetamide | 1.0 |

The above components were heated together under reflux for 5 minutes. The resulting resin syrup had a rapid cure when heated on a 150° C. hot plate. This syrup was mixed with 61 parts alpha flock and 0.5 part of a mold lubricant, specifically zinc stearate, and dried at 50° C. to form a molding composition. This composition had exceptional time- and heat-stability as evidenced by the fact that it could be heated for 68 hours at 50° C. without loss of plastic flow or moldability. Molded articles of light color, exceptional translucency and water resistance were obtained by molding the plastic mass at about 130° C. under a pressure of approximately 2000 to 3000 pounds per square inch.

*Example 2*

Same formula as in Example 1. All the ingredients with the exception of the halogenated acetamide, specifically monochloroacetamide, were reacted under reflux for 20 to 30 minutes. To the resulting partial condensation product was added the monochloroacetamide and the mass refluxed for an additional 10 minutes to effect further condensation. The resin syrup was mixed with alpha cellulose (alpha flock), as described under Example 1, to form a molding compound. Molded articles similar to those of Example 1 were obtained by molding under heat and pressure.

The urea-formaldehyde-monochloroacetamide resin syrup may be dehydrated under vacuum to produce a substantially anhydrous liquid which is particularly suitable for use in so-called "solventless" impregnating or laminating applications.

Example 3

Same formula is in Example 1. However, in this example the mass was not refluxed after adding the monochloroacetamide but instead alpha flock and zinc stearate in the amounts mentioned in Example 1 immediately were incorporated into the mass. The compound was heated at approximately 50° C. to effect further condensation between the components simultaneously with drying of the mass. Molded articles of good characteristics were obtained.

Example 4

Same formula as in Example 1. In this case a molding composition was prepared by incorporating alpha flock and zinc stearate into the urea-formaldehyde syrup prepared without the addition of the monochloroacetamide, after which the composition was dried and an alcoholic solution of the said halogenated amide was mixed with the dried compound. The alcohol-moist compound was heated to effect intermediate condensation of the monochloroacetamide with the excess formaldehyde present in the urea-resin syrup and simultaneously to dry the mass. This molding compound converted rapidly to a hardened state under heat and pressure, yielding molded articles of good appearance.

Example 5

| | Parts by weight |
|---|---|
| Urea | 60.0 |
| Aqueous formaldehyde (approximately 37.1% HCHO) | 161.0 |
| Monochloroacetamide | 0.1 |

The mixed components were heated to boiling, after which 61 parts alpha flock and 0.5 part zinc stearate were mixed with the resin syrup, followed by drying to yield a molding compound.

Example 6

| | Parts by weight |
|---|---|
| Urea | 60.0 |
| Aqueous ammonia (28% NH$_3$) | 7.6 |
| Aqueous formaldehyde (approximately 37.1% HCHO) | 161.0 |
| Sodium hydroxide (in 15 parts water) | 0.06 |
| Dichloroacetamide | 8.0 |

The above components were heated under reflux for approximately 45 minutes. Seventy (70) parts alpha flock were added to the clear hot syrup and the resulting compound, after air drying for about 16 hours, was further dried for approximately 1 hour at about 50° C. Molded articles similar in general characteristics to those of Examples 1 to 4 were obtained. The self-curing characteristics of the intermediate condensation products of this example are not so pronounced as the partial condensation products obtained by using monochloroacetamide. Hence the resin syrups made with dicholoacetamide are particularly suitable for use in laminating applications where an extended intermediate plastic condition is required.

Example 7

Same formula as in Example 6 with the exception that 1.0 part trichloroacetamide was employed. Essentially the same procedure was used in making the resin and molding composition as described under Example 6. The self-curing characteristics of the composition were more pronounced than similar compositions made with monochloroacetamide.

Although under Examples 6 and 7 I have described by way of illustration only one method of effecting these condensation reactions, the same modifications are possible in the preparation of these compositions as described under Examples 2 to 5, inclusive.

Condensation products of urea and formaldehyde alone, prepared as described under Examples 1 to 7, inclusive, but not inter-condensed with the specific halogenated amide mentioned in the individual example are heat-non-convertible. In other words, they will not cure under heat or under heat and pressure to the insoluble, infusible state.

In certain cases, it may be advantageous to use a single halogenated amide with a plurality of urea substances. Thus, to modify the characteristics of the molded product I may uset a mixture of, for example, urea and dicyandiamide, with a single halogenated amide. In other cases, instead of using a single halogenated amide, I may use a plurality of halogenated amides with a single urea substance or with a plurality of urea substances.

The ratio of the reactants of each other may be considerably varied but, in general, it is desirable to use at least one mol of an aliphatic aldehyde for each mol of urea substance. In producing the heat-convertible resinous condensation products of this invention, the proportion of halogenated amide in all cases is at least sufficient to impart self-curing characteristics to the resin. Ordinarily not exceeding substantially ¼ mol halogenated amide is used for each mol of urea substance. No advantage accrues from using an amount of halogenated amide above the minimum required to secure the desired curing rate. Further, the use of higher amounts of halogenated amide is undesirable for most molding applications because of the greater difficulty in obtaining molded articles of suitable hardness, but may not be objectionable for other applications of the material.

From the foregoing it will be seen that the particular mol ratio of halogenated amide to the other components is dependent somewhat upon the inherent characteristics of the halogenated amide and the curing characteristics and other properties desired in the heat-convertible and heat-hardened resinous condensation products. For molding applications the ratio of the aliphatic aldehyde to urea substance may be considerably varied, but generally will be within the range of 1½ to 2½ mols aliphatic aldehyde for each mol of urea substance. No particular advantage ordinarily accrues from the use of higher amounts of aldehyde. Approximately 2 mols aliphatic aldehyde per mol urea substance usually gives very satisfactory results, particularly from the viewpoint of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc. alcohols; polyhydric alcohols such as ethylene glycol, diethylene glycol, glycerine, pentaerythritol, trimethylol nitro methane, etc.; monoamides such as formamide, acetamide, stearamide, acrylic acid amides (acryloamides), benzamide, toluene sulfonamide, etc.; polyamides such as adipic diamide, phthalamide and the like; amines such as ethylene diamine, aniline, phenylene diamine, amino phenols, etc.

The modifying bodies also may take the form of high molecular weight bodies, with or without resinous characteristics, for example hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositons from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance of water, fire, solvents, etc., is obtained only when the applied coating or sizing is converted to the insoluble, infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

In my copending application Serial No. 371,395, filed December 23, 1940, I have disclosed and claimed a composition of matter comprising the product of reaction of a chlorinated acetamide with a partial condensation product of ingredients comprising essentially (a) a urea other than a urea containing a methylol grouping and (b) a preformed compound consisting of a urea containing at least two methylol groupings. In my copending application Serial No. 378,933, filed February 14, 1941, I have disclosed and claimed a composition comprising a reaction product of ingredients comprising a preformed polymethylol melamine and a halogenated acetamide, specifically a chlorinated acetamide, as well as a composition comprising the product of reaction of ingredients comprising a preformed polymethylol melamine, urea and a halogenated acetamide. In my copending application Serial No. 378,934, also filed February 14, 1941, I have disclosed and claimed a composition comprising a reaction product of ingredients comprising preformed dimethylol urea and a halogenated acetamide, more particularly a chlorinated acetamide. In my copending application Serial No. 409,838, filed September 6, 1941, which application is a continuation-in-part of the present application, I have disclosed and claimed a composition comprising the condensation product of ingredients comprising an aminotriazine, specifically melamine, an aldehyde and a halogenated amide selected from the class consisting of alpha halogenated amides, beta halogenated amides and alpha beta halogenated amides, which amides contain at least one —CONH₂ grouping, more particularly a halogenated acetamide such as a chlorinated acetamide, as well as compositions wherein a urea is a reactant in addition to an aminotriazine. In my copending application Serial No. 415,938, filed October 21, 1941, which application also is a continuation-in-part of the present application, I have disclosed and claimed a composition comprising the condensation product of ingredients comprising an aminotriazole, specifically guanazole, an aldehyde and a halogenated amide such as mentioned in the preceding sentence with referenec to application Serial No. 409,838, as well as compositions wherein a urea is a reactant in addition to an aminotriazole.

What I claim as new and desire to secure by Letters Patent of the United States is:

1. A composition of matter comprising a condensation product of ingredients comprising a urea, an aliphatic aldehyde and a chlorinated acetamide.

2. A composition of matter comprising an alcohol-modified, heat-hardenable condensation product of ingredients comprising a urea, an aliphatic aldehyde and a chlorinated acetamide.

3. A heat-curable resinous condensation product of ingredients comprising a urea, formaldehyde and a chlorinated acetamide, the proportion of the said chlorinated acetamide being sufficient to yield a heat-curable condensation product.

4. A product comprising the cured resinous composition of claim 3.

5. A condensation product of a mixture comprising a urea, an aliphatic aldehyde and a chlorinated acetamide.

6. A heat-hardenable resinous condensation product of a mixture comprising urea, formaldehyde and a chlorinated acetamide.

7. A soluble fusible resinous condensation product of ingredients comprising the following components in the stated molar ratios: 1 mol urea, at least 1 mol formaldehyde and not exceeding substantially ¼ mol monochloroacetamide.

8. The method of producing a heat-hardenable resinous composition which comprises effecting partial reaction between ingredients comprising the following components in the stated molar ratios: 1 mol of a urea, at least 1 mold of formaldehyde and not exceeding substantially ¼ mol of a chlorinated acetamide.

9. The method which comprises effecting reaction between ingredients comprising a urea, an aliphatic aldehyde and a chlorinated acetamide.

10. A resinous composition obtained by reaction of a mixture comprising (1) a chlorinated acetamide and (2) a partial condensation product of ingredients comprising a urea and an aliphatic aldehyde.

11. A resinous composition obtained by reaction of a mixture comprising (1) a chlorinated acetamide, and (2) an alkaline-catalyzed partial condensation product of ingredients comprising a urea and formaldehyde.

12. A resinous composition obtained by reaction of a mixture comprising (1) monochloroacetamide and (2) a product of partial condensation of ingredients comprising urea and formaldehyde while admixed with a small amount of alkaline material comprising ammonia and sodium hydroxide.

13. A resinous composition comprising a condensation product of ingredients comprising the following components in the stated molar ratios: 1 mol of a urea, at least 1 mol of formaldehyde and not exceeding substantially ¼ mol of a chlorinated acetamide.

GAETANO F. D'ALELIO.